310-11 SR SEARCH ROOM
FIP8502 OR 3,178,596

April 13, 1965 T. R. BROGAN 3,178,596

ANISOTROPIC WALL STRUCTURE

Filed Oct. 26, 1960 5 Sheets-Sheet 1

THOMAS R. BROGAN
*INVENTOR*

BY Alden D. Redfield
Warren Kunz
ATTORNEYS

THOMAS R. BROGAN
*INVENTOR*

BY Alden D. Redfield
Warren Kunz
ATTORNEYS

April 13, 1965 T. R. BROGAN 3,178,596

ANISOTROPIC WALL STRUCTURE

Filed Oct. 26, 1960 5 Sheets-Sheet 3

THOMAS R. BROGAN
*INVENTOR*

BY Alden D. Redfield
Warren Kunz
ATTORNEYS

ANISOTROPIC WALL STRUCTURE

Filed Oct. 26, 1960

THOMAS R. BROGAN
INVENTOR

BY Alden D. Redfield
Warren Kunz
ATTORNEYS

ANISOTROPIC WALL STRUCTURE

Filed Oct. 26, 1960 5 Sheets-Sheet 5

THOMAS R. BROGAN
*INVENTOR*

BY Alden D. Redfield
Warren Kunz
ATTORNEYS 3,178,596
Patented Apr. 13, 1965

3,178,596

ANISOTROPIC WALL STRUCTURE

Thomas R. Brogan, Arlington, Mass., assignor to Avco Corporation, Cincinnati, Ohio, a corporation of Delaware Filed Oct. 26, 1960, Ser. No. 65,216
18 Claims. (Cl. 310—11)

The present invention relates to a wall structure having anisotropic properties and more particularly to a wall structure having markedly different electrical and thermal conductivities in directions parallel to and perpendicular to its surface. More particularly, the invention relates to a wall structure having excellent thermal conductivity in a direction perpendicular to its surface but substantially no electrical conductivity in the plane of the wall.

Although not limited to such applications, the novel structure finds particular use in magnetohydrodynamic (abbreviated MHD) devices, such as generators for producing electrical power. For convenience, the invention will be described in an MHD environment but it will be understood by those skilled in the art that the environment in no way constitutes a limitation of the invention.

Magnetohydrodynamics is growing rapidly in importance, particularly in electric power generation. Unlike more conventional generating equipment that involves many moving parts and appears to have reached the zenith of its development, MHD generators have no moving parts and may be expected to far excel conventional equipment in efficiency of operation. In general terms, an MHD generator comprises a duct through which high temperature, electrically conductive gas flows at high velocity. A magnetic field is provided through the duct perpendicular to the direction of gas flow. Movement of the gas relative to the magnetic field induces an electromotive force at right angles to both the direction of gas flow and the field. This electromotive force can be used to establish flow of current between opposed electrodes in communication with the gas stream and through a load circuit connected to the electrodes provided that the gas is a conductor of electricity.

Since a potential difference exists between the electrodes within the generator, and a potential gradient exists within the gas stream itself, it will be immediately apparent that the generator walls must not conduct electricity lest they short-circuit these potentials.

It is also to be noted that the gas temperatures may be so high that known materials cannot maintain their structural integrity at such temperature levels. In much the same way that the theoretical efficiency of a turbine is a function of the temperature difference experienced by the working fluid in passing through the turbine, the efficiency of an MHD generator is likewise dependent upon the temperature drop of the conductive gases passing through it. Since no moving parts are involved, higher inlet temperatures can be used than in conventional equipment. Not only does the higher inlet temperature improve operating efficiency but it also aids in increasing the electrical conductivity of the gas stream. It necessarily follows that in practical, continuous duty generators the walls must be cooled to lower their temperature to safe operating limits.

The present invention satisfies both of the foregoing electrical and thermal conductivity requirements.

First, it should be noted that few materials are known that have, at high temperature, high thermal conductivity and low electrical conductivity. Such materials are not at present considered practical for use in MHD generators. If the walls of a generator were simply constructed of metal, they could be readily cooled, as by water cooling, but they would provide a highly conductive path through which the generated potential would readily be short-circuited. On the other hand, if the entire walls were made of a refractory substance, they would act as electrical insulators but have insufficient thermal conductivity to make effective cooling possible. In contrast, the novel wall described herein is of such a nature that heat may readily be conducted through the wall while low electrical conductivity is maintained in the plane of the wall.

Briefly, the present invention comprises members of good thermal conductivity oriented prependicular to the surface of the wall. These elements are electrically insulated from one another so that current flow through the wall parallel to its surface is not possible. Further, each conductive member is proportioned so that the potential difference across it is lower than the potential necessary to establish an arc discharge from the gas to the member. Thus, the entire wall, both as to the electrodes and the associated gas stream, acts as an electrical insulator having good heat transfer characteristics.

In the preferred embodiment of the invention the conductive members comprise individual metal rods that are secured to electrically nonconductive plates. The rods project into the interior of the generator duct and are spaced from one another to accommodate an electrically nonconductive refractory that is disposed between the rods and flush with their projecting ends to form a smooth interior for the generator duct. This construction, which, for convenience, may be termed a "metal mosaic" provides a high rate of heat transfer through the rods and electrical isolation, as well as thermal isolation, of the rods in all directions in the plane of the wall parallel to its surface. The heat transferred by the rods may be dissipated in a cooling medium circulated adjacent the plates.

Mention has already been made of the potential gradients existing across the generator duct between opposed generator electrodes. Depending upon the design of the generator and its mode of operation, other potentials, resulting from the "Hall field" parallel to the length of the duct, may exist in the gas stream. The preferred novel wall construction is also effective in preventing short-circuiting of such potentials, as will be described in greater detail.

In view of the foregoing general comments, it will be apparent that a broad object of the invention is to provide a novel wall having anisotropic properties, and more specifically, having different thermal and electrical conductivities in directions perpendicular and parallel to its surface.

Another object of the invention is to provide an improved wall structure that is well adapted for use in MHD equipment.

A further object of the invention is to provide a wall structure that will conduct heat readily in directions perpendicular to its surface and which serves as an electrical insulator in the plane of the wall.

It is also an object of the invention to provide a novel wall in which metallic elements are oriented perpendicular to its surface and are electrically isolated from one another.

Still another object of the invention is the provision of a wall in which individual cooling elements are embedded in the wall for conducting heat therethrough while being arranged to prevent current flow in the plane of the wall under the influence of adjacent electrical potentials.

Other objects of the invention are as follows:

(*a*) The provision of an anisotropic wall having strength sufficient to withstand both the gas pressures and coolant pressures present in an MHD generator.

(*b*) The provision of a wall for an MHD device having good thermal conductivity normal to its plane, low electrical conductivity in its plane, and a smooth interior surface for minimizing friction and heat losses in gases passing over it.

(*c*) A wall structure having simple coolant flow paths for effectively cooling the wall with a minimum of losses.

The novel features that are considered characteristic of the invention are set forth in the appended claims; the invention itself, however, both as to its organization and practical application, together with additional objects and advantages thereof, will best be understood from the following description of specific embodiments when read in conjunction with the accompanying drawings, in which:

Figure 1:
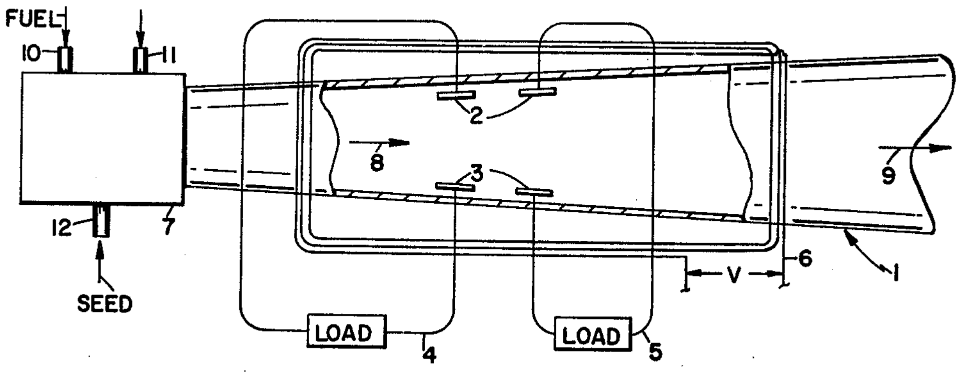
FIGURE 1 is a schematic illustration of an MHD generator in which the present invention may be used to advantage.

Directing attention to FIGURE 1, an MHD generator installation is shown comprising a generator duct, generally designated 1, having associated with it a plurality of opposed electrodes 2 and 3 that are electrically connected in external load circuits 4 and 5. Surrounding the exterior of the duct is an electrically conductive coil 6 that may be energized from a voltage source V provided by any conventional means, such as an auxiliary generator (not shown), or the MHD generator itself, to produce a unidirectional magnetic field through the duct perpendicular to the plane of the paper. A combustion chamber 7 delivers to the duct a high temperature, high velocity gas stream, indicated by the arrow 8, the gas leaving the duct at 9. The combustion chamber, which comprises no part of the present invention, may be supplied with any fuel, such as fuel oil, and with a combustion supporting medium, such as air, pure oxygen or an oxygen-nitrogen mixture having an oxygen concentration in excess of that of air. The means for introducing the fuel and combustion supporting medium are indicated at 10 and 11. To enhance the conductivity of the gas stream there may be introduced to the combustion chamber at 12 an easily ionizable "seed," such as sodium, potassium, or cesium, or their salts, usually in an amount less than 1% of the weight of fuel. The gas, upon entering the generator duct may have a temperature in excess of 5000° F.

Figure 2:
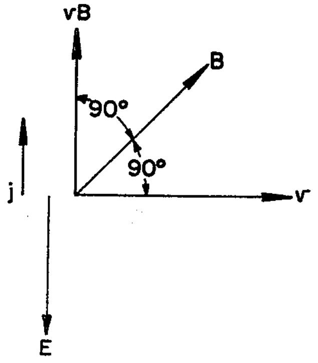
FIGURE 2 is a vectorial representation of current, magnetic field and gas velocity conditions within an MHD generator in which the Hall field is negligible.

The vector diagram of FIGURE 2 indicates the gas travelling at velocity $v$ through the transverse magnetic field B. The interaction of the conductive gas with the magnetic field induces a potential gradient within the gas stream that is the cross product of $v\times B$ in a direction perpendicular to both the direction of gas movement and the magnetic field. Because of loading and also voltage drops at the electrodes, the electric field E between the electrodes is somewhat smaller than $v\times B$ and may be approximately 0.5–0.8 of the $v\times B$ value. Shown parallel to the E vector in FIGURE 2 is the $j$ vector indicating current flow through the conductive gas between the electrodes.

The $v\times B$ potential gradient exists within the gas stream and will be short-circuited through the side walls of the generator duct unless they are made electrically nonconductive. A wall that has the desirable thermal and electrical conductivities for use under conditions illustrated in FIGURE 2 will be described in connection with FIGURES 4 and 5.

Figure 3:
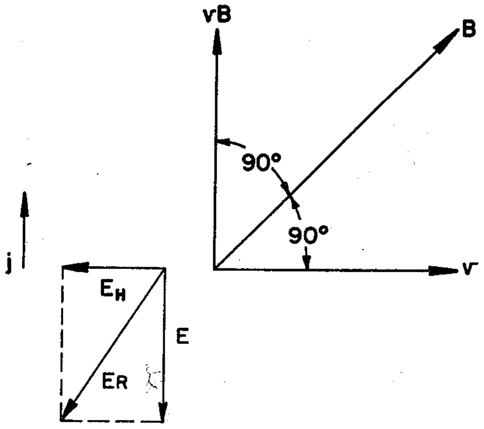
FIGURE 3 is a vectorial representation of current, magnetic field and velocity conditions within an MHD generator in which the Hall field is significant.

Shown in FIGURE 3 are the current, magnetic field and potential conditions within a gas generator in which the Hall field is significant.

Origin of the Hall field may now be considered. It should be recognized that the gas moving through the generator duct is a slightly ionized plasma having a substantially equal number of positive ions and electrons. Since the electrons are very much lighter than the ions, they have far greater mobility in an electron field and carry the great majority of the current. The current flow between opposed electrodes is thus due almost entirely to electron flow. The drift velocity of the electrons, $v_e$, is given by the following equation:

$$v_e=\frac{j}{n_e e}\text{ meters/sec.} \qquad (1)$$

where:

$j$=current density (amps/meter$^2$)
$n_e$=electron density (meter$^{-3}$)
$e$=electron charge, coulombs It should be noted, however, that the drift velocity of the electrons is perpendicular to the magnetic field B. This causes an electric field (known as the "Hall field" $E_H$) to be induced along the length of the duct. This field may be calculated from the following equation:

$$E_H=v_eB=\frac{j}{n_e e}=\omega\tau vB(1-\alpha) \qquad (2)$$

where:

$\omega$=electron cyclotron velocity (sec.$^{-1}$)
$\tau$=mean electron collision time (sec.)
$\alpha=E/vB$ (non-dimensional)
$E$=electric field between electrodes (volts/meter)

Directing attention now to FIGURE 3, the gas velocity is again designated $v$ and the magnetic field is designated B. As described with reference to FIGURE 2, the $v\times B$ potential gradient is induced as a result of the gas movement through the field. This results in an electric field E between the opposed electrodes. However, the Hall field $E_H$ is directed along the axis of the gas stream in a direction opposite to its movement. The resulting electric field $E_R$ is thus directed at an angle to the direction of movement of the gas stream.

For gases of practical interest for use in MHD generators, the Hall field can be quite large, equal sometimes to two to three times the size of $v\times B$. If an electrically conductive path exists along which the Hall field can establish current flow, a reduction of electrical conductivity in the direction of the opposed electrodes will result, resulting in an impairment of over-all generator performance. By means of the present invention, a novel construction for the generator wall is provided that will prevent flow of current in the plane of the wall under the influence of the resultant electric field. As a result, the current flow can be confined to the gas path between opposed electrodes. Such current flow is indicated by the vector $j$ in FIGURE 3.

In partial summary, it will be noted from FIGURES 2 and 3, that the present invention is designed to prevent short-circuiting of the resultant of the electric field E and the Hall field $E_H$ by way of the walls of the generator duct. At the same time, the wall has sufficient thermal conductivity that its temperature may be reduced to safe operating limits.

Figure 4:
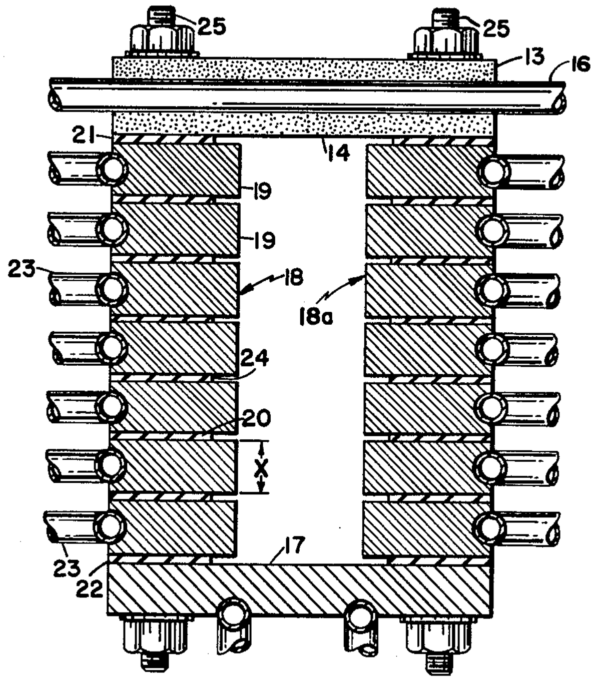
FIGURE 4 is a cross sectional view and FIGURE 5 is a side elevational view of a duct for a generator in which the Hall field is negligible and the induced field is relatively uniform.
Figure 5:
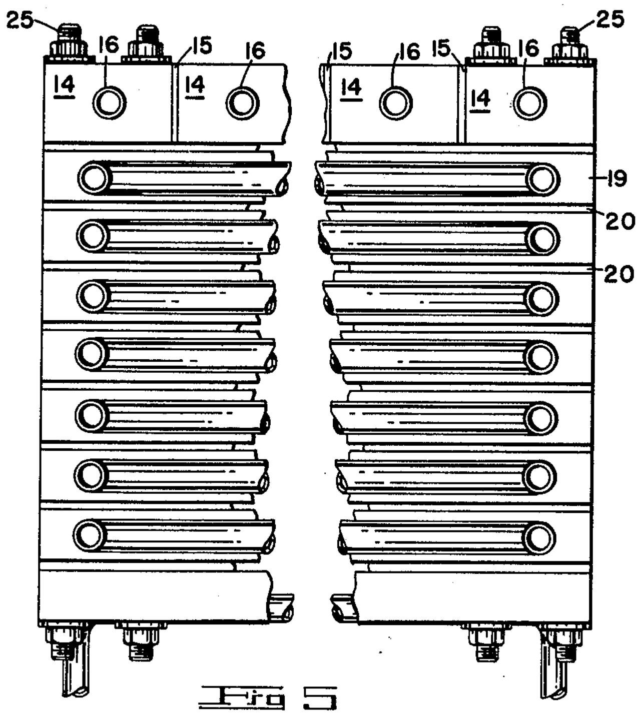

Attention is now invited to FIGURES 4 and 5 which show a duct for use in a generator in which the Hall field is not significant under normal operating conditions and in which the electric field across the duct between opposed electrodes is substantially constant throughout the length of the duct. Referring first to the cross sectional view of the duct, its top wall 13 comprises a plurality of carbon cathodes 14 (see FIGURE 5) that are electrically isolated from one another by insulators 15. A pipe 16 conducts water through each cathode for cooling purposes. The bottom wall 17 of the duct may comprise a slab of copper that serves as an anode. As will be understood from FIGURE 1, the anode and cathodes are connected to a load circuit (not shown). Use of separate cathodes assures uniform current distribution along the length of the duct.

The side walls of the generator duct are generally designated 18 and 18*a*. Since the construction of each wall is the same, the details will only be described with reference to one wall.

Side wall 18 comprises a plurality of metal bars 19 extending the full length of the duct (see FIGURE 5). Between each of the bars is a thin layer of insulating material 20. Adjacent the uppermost bar and the lowermost bar, insulating layers 21 and 22 are also provided to prevent conduction of electricity between the electrodes (anode and cathodes) and the side walls. Associated with the exterior surface of each of the bars 19 is a cooling water pipe 23 for cooling the bars to safe operating temperature levels.

The material from which bars 19 are made is not critical. Copper is satisfactory because of its high thermal conductivity, but other metals can be used equally well. The insulating material may be plastic, such as Teflon, made sufficiently thin to be cooled to an acceptably low temperature by heat transfer to the bars. Further, the insulators do not extend to the interior of the duct (note the inner edge 24 of the insulators) and hence are not subjected to significant conductive heat transfer from the gas stream.

Electrically insulated through bolts 25 clamp the side walls together and hold them in proper position relative to the electrodes. As will be understood by those skilled in the art, the duct itself may be connected to a gas source, such as a combustion chamber, and to an exhaust system (not shown) by any conventional means. For instance, the duct may simply be clamped between its associated components in a complete MHD generator installation.

An over-all consideration of the FIGURE 4–5 construction will reveal that the side walls 18 and 18*a* of the duct are excellent conductors of heat in directions perpendicular to their planes but will not conduct electricity transversely to the duct under the influence of the $v \times B$ electric field. Since no Hall field is present and $v \times B$ is substantially uniform along the length of the duct, the electrical conductivity characteristics of the side walls in directions parallel to the gas movement are unimportant. The thickness "X" of each bar is such that the voltage across it is not sufficient to initiate striking of an arc to the bar; as a result, the current flows between the electrodes more easily through the gas than through the bars, as will be explained more fully.

Figure 6:
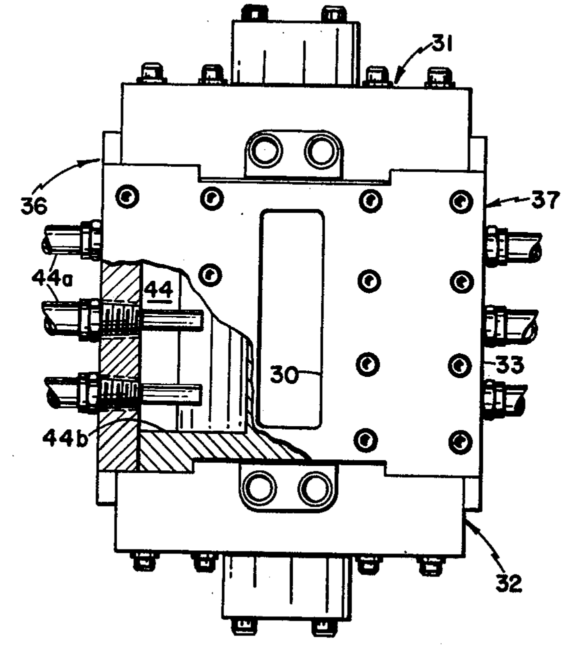
FIGURE 6 is an end view of a duct for a generator in which the Hall field is significant.
Figure 7:
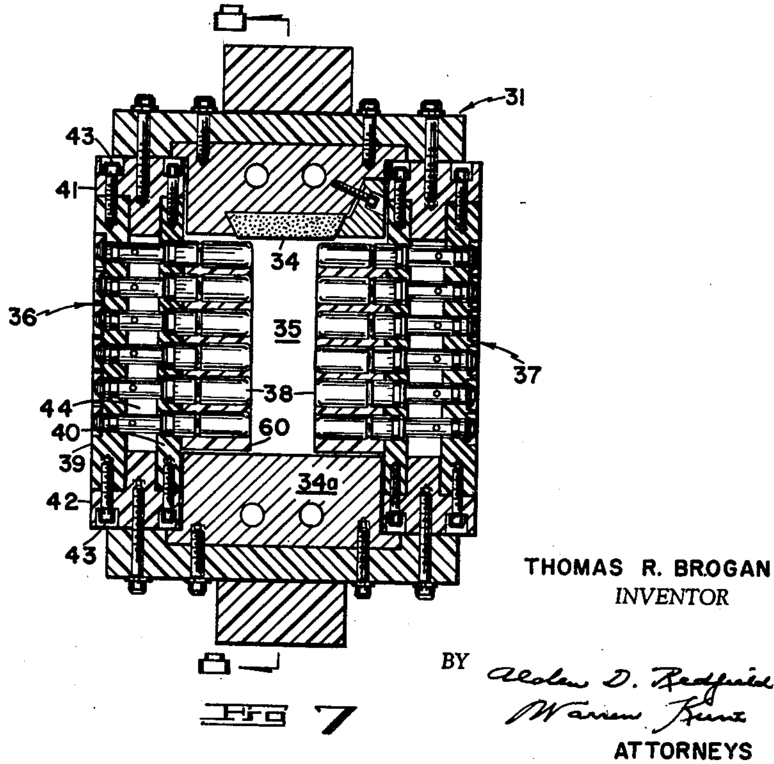
FIGURE 7 is a cross sectional view of the duct shown in FIGURE 6.
Figure 8:
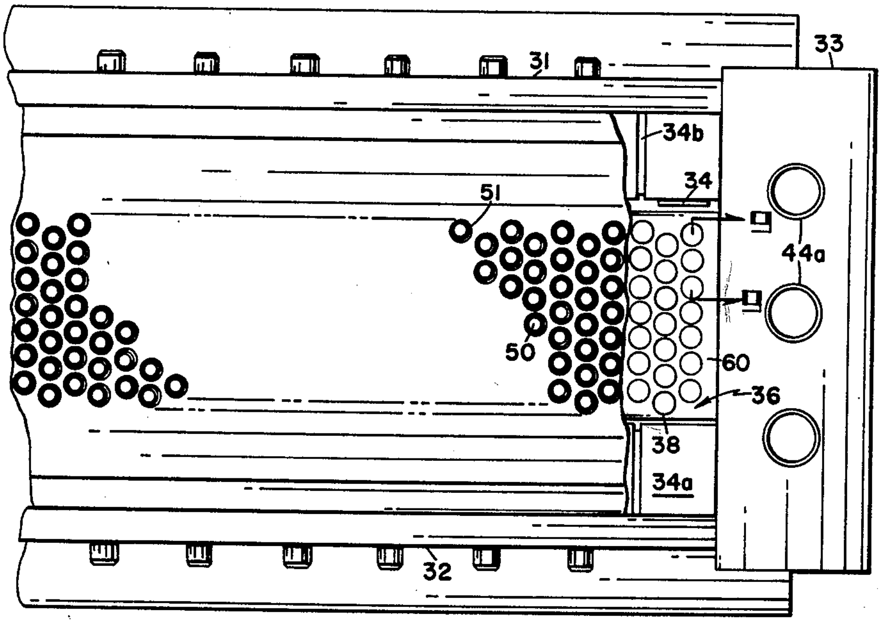
FIGURE 8 is a longitudinal sectional view of a duct taken on plane 8—8 of FIGURE 7.

FIGURES 6–8 show a generator duct for use in a generator having a significant Hall field and/or a non-uniform induced field. Under such circumstances, the side walls of the generator duct must be electrically non-conducting in all directions in the plane of the walls.

FIGURE 6 shows an end view of the assembled duct including an inlet port 30 through which the high temperature gas is introduced to the duct. Electrode assemblies, generally designated 32 and 32 extend the length of the duct and are attached at their ends to end plates, one of which is shown at 33. The side walls, designated generally 36 and 37, are sealed and secured to the end plates. Each wall supports a plurality of metallic rods 38 that extend into the duct, their inner ends cooperating in defining the flow channel for the gas.

From FIGURES 7 and 8, it is apparent that the electrode assembly 31 supports a plurality of carbon cathodes, one of which is shown at 34, that are in communication with the gas flowing through the interior of the duct 35. Electrode assembly 32 supports a plurality of copper anodes 34*a*, also in communication with the gas. The cathodes are electrically insulated from each other by plastic separators 34*b*. The anodes are similarly insulated. By insulating the cathodes and anodes in this manner, electrical short circuits through the electrode assemblies are prevented. The advantage of separating the electrodes in segments as well as various load circuits that may be used with such electrodes are more fully set forth and claimed in U.S. patent application Serial No. 860,973, filed by Arthur R. Kantrowitz et al. on December 21, 1959, entitled "Means For and Method of Preventing Hall Currents in Electrical Equipment."

Attention may now be directed to the details of construction of side wall 36 which is substantially the same as that of side wall 37. First it will be noted that two parallel spaced plates of insulating material are provided at 39 and 40. These are secured to a top spacer bar 41 and a bottom spacer bar 42, the bars and plates being held in assembled relationship by cap screws 43.

Plates 39 and 40 define between them a coolant channel 44. The rods 38 extend from the exterior of the wall assembly through the channel to the interior of the duct. Shown in FIGURE 6 are coolant inlet pipes 44*a* through which coolant is supplied to header 44*b*. From the header the coolant flows to channel 44. Attention is called to the fact that a straight-through coolant path is provided and that all of the rods in one wall of the generator may be cooled from a common channel.

The coolant may be water. After cooling the walls of the duct, the water may be supplied to a steam-electric generating system (not shown) that may be used to supplement the electrical output of the MHB generator.

Figure 9:
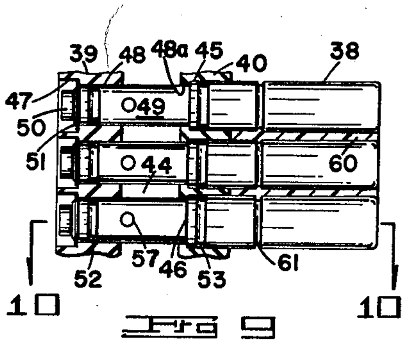
FIGURE 9 is an enlarged view of a plurality of rods in assembled relationship within the generator duct illustrated in FIGURES 6–8; the view being taken on plane 9—9 of FIGURE 8.

The assembly of the rods to the plates 39 and 40 can be better understood from a study of FIGURE 9 which shows three rods in assembled position. It will be noted that plate 40 defines a counterbored hole 45 with which a shoulder 46 of the rod 38 cooperates. Plate 39 also defines a counterbored hole 47 that is co-axial with hole 45 and with holes 48 and 48*a* through which the shank 49 of the rod extends. The shank terminates in a section 50 of reduced diameter on which may be force-fitted a washer 51 which engages the bottom of counterbored hole 47. In effect, the shank 49 of the rod serves as a through-bolt for preventing plates 39 and 40 from being forced apart under the pressure of coolant flowing between them. The shoulder 46 of the rod and washer 51 in turn prevent rotation and axial movement of the rods relative to their supporting plates. O-ring seals may be provided at 52 and 53 to prevent leakage of coolant from the coolant space between the plates.

Figure 10:
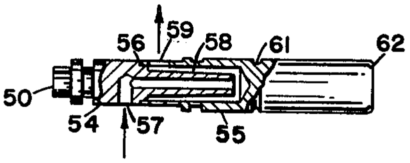
FIGURE 10 is an enlarged fragmentary sectional view of one of the rods as viewed on plane 10—10 of FIGURE 9.

In FIGURE 10, the internal construction of one of the rods is shown. It comprises a section 54 brazed within surrounding section 55, the joint therebetween being shown at 56. Section 54 includes an inlet port 57 that communicates with a nozzle 58 extending within the interior of section 55. Coolant may enter at 57 and flow by way of nozzle 58 into the hollow interior of section 55. The coolant then counterflows along the exterior of the nozzle to an outlet port 59 formed in section 55 of the rod.

Returning to FIGURE 9, it will be noted that inlet ports 57 of all of the rods face in a common direction in the coolant channel 44. In use, the cooling water flows towards the rods in a direction perpendicular to the plane of the paper. Since the shanks of the rods constitute an obstruction to the coolant, a pressure drop occurs across them providing a pressure head for forcing the coolant through the interior of the rods.

The need for internal cooling of the rods depends upon the operating characteristics of the generator, and more particularly, the temperature pressure, velocity and type of gas that is employed. For some generators, internal cooling of the rods may be unnecessary and the heat transfer from the exteriors of the shanks to the coolant may be satisfactory. In any event, sufficient heat must be extracted from the rods to protect the support plates 39 and 40 and the O-rings 52 and 53 from overheating.

Attention should now be directed to FIGURE 8 which shows a part of the generator duct in longitudinal section and the interior surface of wall 36 in elevation. It will be noted that the rods 38 are closely packed but not touching. Desirably, for heat transfer purposes, the rods should comprise as large a portion of the wall as possible. In order to prevent radiant heat transfer to plate 40, the spaces between the rods may be filled in with a refractory material 60. Grooves 61 are provided in the rods for accommodating the refractory material, which is installed in a plastic state. In this way, the refractory, after it has hardened, is mechanically keyed to the rods and a strong wall structure is assured. The refractory may be troweled into the spaces between the rods until it is flush with their projecting ends. A smooth interior surface is thus provided for accommodating the gas flow with a minimum of friction losses and heat transfer. By maintaining a small space between the rods, electrical conduction therebetween is prevented and cooling of the refractory is assured even at high heat transfer rate.

It has been found convenient to make the rods of soft copper because of its high thermal conductivity. On the other hand, the material does not constitute a limitation of the invention and other highly conductive metals, such as stainless steel, may be used. The supporting plates 39 and 40 may be made from any durable material having good strength at the temperature and pressures to be encountered. A plastic that has been found satisfactory is sold under the trademark Pyrotex. It is a low flow, low resin, high pressure, laminated plastic identified by Style No. 41–RPD and manufactured by Raybestos-Manhattan, Inc., Manheim, Pa. As in the case of the other components, the refractory material is not critical since heat transferred to the refractory is easily transferred to the metal rods through relatively thin refractory sections. One material that is deemed satisfactory is sold under the trademark Blazecrete 3X, manufactured by Johns-Manville, New York, N.Y.

Although the length of the rods extending from plate 40 into the interior of the generator duct is not critical, the diameter of the rods is of importance. It will be recalled from the discussion of FIGURES 2 and 3, that an electrical field, $E_R$, exists parallel to the interior surface of the wall. If the voltage developed across the diameter of a given rod exceeds the voltage necessary for initiating an arc discharge from the gas stream to the rod, current, instead of flowing in the gas stream, will flow via an arc discharge into and through the rod. To prevent this from happening, it is necessary to proportion the rods so that the product of the local electric field and the characteristic rod diameter is less than the voltage $V_0$ for initiating an arc discharge (arc burning) in the gas. This voltage falls in the range of 10–100 volts for most gas conditions found in a practical MHD generator. For purposes of illustration a typical value of 30 volts may be assumed for $V_0$.

To illustrate by way of example, but not limitation, it may be assumed that the magnetic field B through the duct, is equal to 3 webers/meter$^2$ and that the gas velocity $v$ is 1000 meters/sec. The $v \times B$ product is then equal to 3000 volts/meter. Assuming for simplicity that there is no Hall field, the electric field E may be assumed to be approximately equal to 3000 volts/meter. The following calculation may then be made to determine the characteristic rod diameter $d$:

$$v \times B \times d < V_0$$

$$d < \frac{V_0}{v \times B} < \frac{30}{3000}$$

$$d < .01 \text{ meter}$$

If a Hall field is present, the value of $E_R$ may be two to three times greater than $v \times B$ and the rod diameter must be correspondingly reduced in size.

Since arcs tend to concentrate at sharp corners of conducting members, the ends 62 of the rods are rounded (see FIGURE 10).

With regard to the spacing between adjacent rods, it is merely necessary that it be such that no current will flow through the space between adjacent rods. In some generators where operating temperatures are not high, it is possible to eliminate the refractory material and merely depend, for insulating purposes, upon the insulating qualities of the stagnant, relatively cool, air mass that exists in the space between the rods.

For convenience of manufacture, the rods may have a circular cross section. It should be clearly understood, however, that such a configuration is not necessary to the success of the invention. Indeed the cross sectional shape of the rods could be square, hexagonal, or any other shape and size that meet the foregoing criterion with respect to arc discharge to the rods.

The embodiment of the invention illustrated in FIGURES 6–10 is more fully described and claimed in pending patent application Serial No. 73,374, filed on December 2, 1960, now U.S. Patent No. 3,161,788, which issued December 15, 1964.

Figure 11:
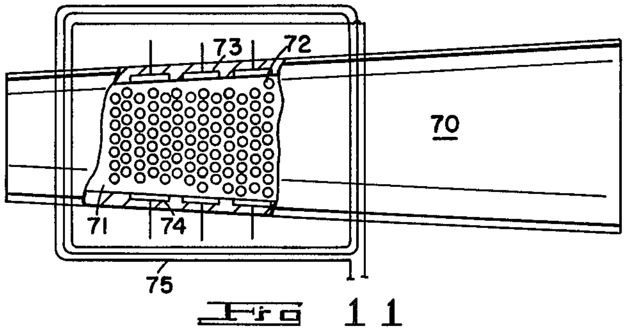
FIGURE 11 is a schematic of a divergent generator duct employing the principles of the invention.

FIGURE 11 is a diagrammatic illustration of a generator duct employing the principles of the present invention. Attention is called to the tapered shape of the duct, the cross sectional area of which increases in the ratio of about 1:4 from the inlet to the outlet. The cross section of the duct at any point may be circular, or rectangular, or any other shape that is found convenient for the design of the particular generator involved. As illustrated, the cross section of the duct is rectangular and has an aspect ratio (ratio of the width to height) of about 1:1.

The generator ducts illustrated in FIGURES 4–8 are particularly useful for research investigations of parameters having bearing on MHD power generation. It should be understood, however, that the proportions of their gas flow channels would not be optimum for a continuous duty MHD generator, which would be proportioned more as illustrated in FIGURE 11.

In the FIGURE 11 duct, the side wall 70 has been broken away to illustrate the interior surface of the remote side wall 71. The projecting ends of a plurality of metal rods are indicated by the circles at 72. The rods, which may be similar to those shown in FIGURES 8–10, fill the area of the wall exposed between opposed electrodes 73 and 74. As in the generators described previously, the electrodes may be segmented, i.e., made in individual sections to prevent short-circuiting of the Hall potential, and a coil 75 may be provided adjacent the duct to establish a magnetic field through it.

Figure 12:
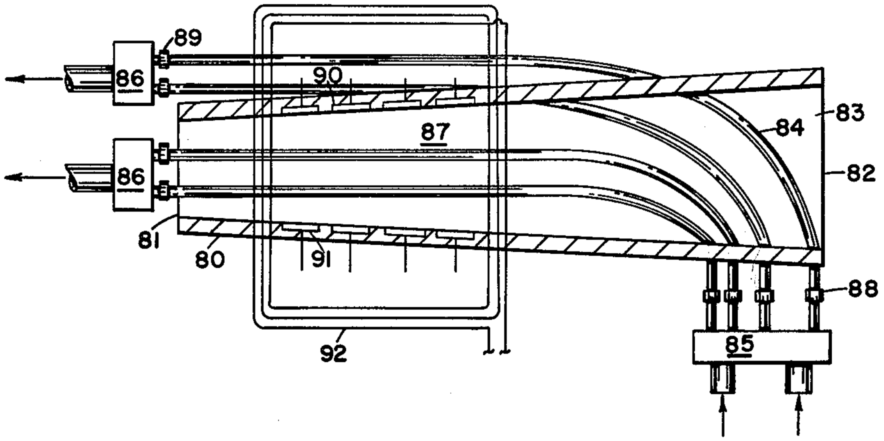
FIGURE 12 is a schematic view of a generator duct employing a modification of the present invention.

In FIGURE 12 is shown a particular arrangement of cooling elements for the duct of an MHD generator that operates under relatively constant conditions. The potential distribution can be completely analyzed and the planes of equal electrical potential can be determined within the flow channel of the duct. If it is assumed that the electrical and aerodynamic conditions within the duct are stable, it will be apparent that the magnitude and direction of the electrical gradients $E_R$ can be established at all points within the duct. The points of equal potential on each gradient can be visualized as lying along planes within the duct. It has been found through analysis that the equipotential planes are nearly parallel to the gas flow near the inlet of the duct where the gas pressure is high and $\omega\tau$ is small. Near the outlet of the duct, the equipotential planes make a larger angle with the direction of gas flow since the gas pressure is lower and $\omega\tau$ is larger. Continuous cooling conduits may be embedded in the side walls of the duct along equipotential planes without danger of short-circuiting electrical fields within the generator. This is apparent since along any continuous conduit no potential gradients exist.

The application of conduits in this fashion is illustrated in FIGURE 12. Shown is a duct 80 having an inlet 81 and an outlet 82. Since the figure shows the duct in longitudinal sectional view, the far wall 83 of the duct is exposed. Embedded within the wall are a plurality of conduits, such as tubes 84, for conveying coolant from an inlet header 85 to outlet headers 86. The wall structure may comprise a layer of electrically nonconductive refractory 87 in which the tubes 84 are embedded, the tubes being exposed to the gas flow or near the surface of the refractory, so that effective cooling is assured.

As mentioned earlier, tubes 84 are nearly parallel to each other near the inlet of the duct but curve across the direction of gas flow near the exit of the duct. Since each of the conduits lies along a plane of equal potential within the gas stream, no current will flow along their length. On the other hand, each of the conduits will float at a potential different from that of the other conduits. To prevent short-circuiting of the conduits through the headers, insulating connectors 88 and 89 are provided in the conduits. Short-circuiting between the conduits is prevented by the refractory material.

It will be understood by those skilled in the art that only four conduits have been shown in FIGURE 12 in order to simplify illustration of the principles of the invention. In practice, more conduits would be provided in a practical generator, depending upon the cooling requirements of the wall structure.

To complete the diagrammatic illustration, electrodes 90 and 91 are shown in the top and bottom walls of the duct. A coil 92 is shown surrounding the duct to provide magnetic flux transverse of the gas movement.

In view of the foregoing, it will be apparent that numerous ways may be devised of cooling the walls of an MHD generator by thermally conductive elements that are not in electrical communication with one another. In this way, a wall structure having selective properties can be cooled satisfactorily but will not short circuit any electrical fields existing adjacent it.

The various features and advantages of the construction disclosed are thought to be clear from the foregoing description. Others, not specifically enumerated, will undoubtedly occur to those versed in the art, as likewise will many advantages and modifications of the preferred embodiment of the invention illustrated, all of which may be achieved without departing from the spirit and scope of the invention, as defined by the following claims.

I claim:

1. A wall structure forming part of a duct for receiving hot electrically conductive gas in an MHD generator comprising a plate of electrical insulation, a plurality of spaced metal rods extending in electrically mutually insulated relation from said plate to a plane spaced therefrom, and refractory material disposed between said rods and substantially filling the space between the plane and said plate.

2. Apparatus as defined in claim 1 in which said plate defines part of a coolant channel and each of said rods is in thermal communication with the coolant channel.

3. A wall structure forming part of a duct for receiving a high temperature electrically conductive fluid in an MHD device comprising a plate of electrical insulation defining a portion of a coolant channel, a plurality of spaced thermally conductive members supported by said plate and extending in electrically mutually insulated relation from the coolant channel through said plate, and electrical insulating material disposed in and substantially filling the spaces between said members adjacent said plate and exterior to the cooling channel.

4. A wall structure forming part of a duct for receiving a high temperature electrically conductive fluid in an MHD device comprising a plate of electrical insulation, a plurality of thermally conductive rods secured to said plate and extending normal thereto in spaced and electrically mutually insulated relationship with each other, and electrical insulating material disposed between said rods and adjacent said plate for defining a continuous surface in cooperation with the ends of said rods remote from said plate.

5. A wall structure forming part of a duct for receiving a high temperature electrically conductive fluid in an MHD device comprising a pluraltiy of metal rods, electrical insulating means for supporting said rods in parallel spaced and electrically mutually insulated relation to each other, the ends of said rods remote from said means defining in part a continuous surface, and a refractory material substantially filling the spaces between said rods.

6. A wall structure forming part of a duct for receiving a high temperature electrically conductive fluid in an MHD device comprising electrical insulating means and a plurality of spaced thermally conductive members secured to said means and extending therefrom in electrically mutually insulated relation, portions of said members remote from said means being exposed to said fluid defining in part one surface of the wall.

7. A wall structure forming part of a duct for receiving a high temperature electrically conductive fluid in an MHD device comprising a plurality of elongated thermally conductive spaced members extending parallel to each other, electrical insulation disposed in and substantially filling the spaces between said elongated members, and means for holding said bars and insulation in fixed relative position and in electrically mutually insulated relation.

8. A three-dimensional wall structure forming part of a duct for receiving a high temperature electrically conductive fluid in an MHD device having high thermal conductivity in one dimension and low electrical conductivity in its other dimensions comprising spaced heat conductors for conveying heat in the direction of one dimension and electrical insulation between said heat conductors to prevent conduction of electricity in the direction of the other dimensions of the wall.

9. A wall structure forming part of a duct for receiving a high temperature electrically conductive fluid in an MHD device that is thermally conductive normal to its surface but electrically nonconductive in its plane comprising a plurality of separate spaced and electrically mutually insulated thermally conductive elements defining the surface of the wall and extending normal thereto and electrical insulating material in and substantially filling the spaces between said first-named elements.

10. A wall structure forming part of a duct for receiving a high temperature electrically conductive fluid in an MHD device comprising spaced cooling elements that are electrically isolated from one another and electrical insulating material disposed in and substantially filling the spaces between said cooling elements, said cooling elements and insulating material defining a continuous surface.

11. A wall structure forming part of an enclosure for high temperature fluids comprising a plurality of thermally conductive and electrically mutually insulated members defining a surface of the wall and electrical insulating material between said members.

12. A wall structure forming part of an enclosure for high temperature fluids comprising a plurality of thermally conductive members extending substantially through the wall and defining at least one surface thereof, said members being electrically isolated from each other.

13. A wall structure forming part of an enclosure for high temperature fluids comprising a plurality of spaced thermally conductive members extending through the wall in the direction of the thickness dimension of the wall for conveying heat through the wall and electrical insulation substantially filling the spaces between said conductive members and electrically isolating them from each other.

14. A wall structure forming part of an enclosure for high temperature fluids comprising cooling elements that are electrically isolated from one another and electrical insulating material disposed adjacent said cooling elements.

15. A wall structure forming part of a duct for high temperature electrically conductive fluids in an MHD device wherein said duct is characterized by the presence of equipotential planes through the duct comprising a plurality of coolant conduits lying along equipotential planes, means electrically insulating said coolant conduits one from another, and electrical insulation disposed between said cooling conduits and defining therewith a continuous surface.

16. Apparatus as defined in claim 15 in which said last-mentioned insulating material comprises a refractory.

17. A wall structure forming part of a duct for high temperature electrically conductive fluids in an MHD device wherein said duct is characterized by the presence of equipotential planes through the duct comprising a plurality of coolant conduits lying along equipotential planes, and means electrically insulating said coolant conduits one from another.

18. A wall structure forming part of a duct for receiving a high temperature electrically conductive fluid in an MHD device comprising a plurality of elongated, thermally conductive elements disposed substantially parallel to and side by side of each other in a laminar array having a thickness dimension extending generally lengthwise of said elements and having width and length dimensions extending generally transversely of said elements, and electrical insulating material disposed in and substantially filling the spaces between said elements, said elements being in electrically mutually insulated relation.

References Cited by the Examiner

UNITED STATES PATENTS

| | | | |
|---|---|---|---|
| 1,863,586 | 6/32 | Wilke | 165—135 |
| 2,874,317 | 2/59 | Couse | 339—18 |
| 2,994,203 | 8/61 | Lackey et al. | 174—15 X |

FOREIGN PATENTS

| | | |
|---|---|---|
| 284,774 | 2/38 | Great Britain. |
| 640,871 | 1/37 | Germany. |

MILTON O. HIRSHFIELD, *Primary Examiner.*

DAVID X. SLINEY, *Examiner.*